Figure 3:
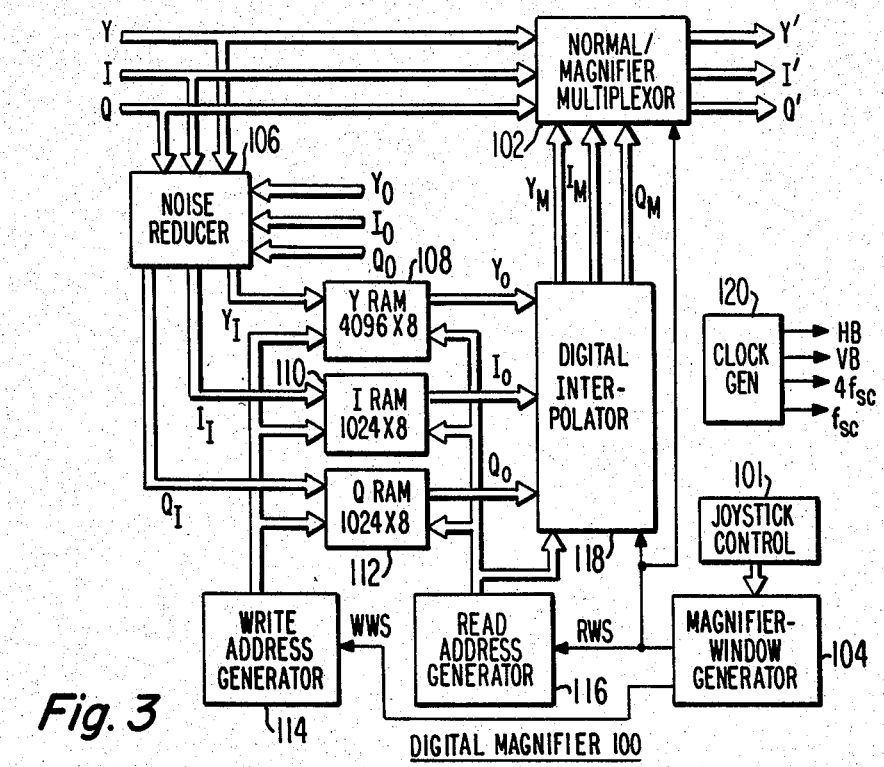

United States Patent [19]

Bolger

[11] Patent Number: 4,528,585
[45] Date of Patent: Jul. 9, 1985

[54] TELEVISION RECEIVER HAVING PICTURE MAGNIFYING APPARATUS

[75] Inventor: Thomas V. Bolger, Merchantville, N.J.

[73] Assignee: RCA Corporation, Princeton, N.J.

[21] Appl. No.: 480,595

[22] Filed: Mar. 30, 1983

[51] Int. Cl.³ .................. H04N 9/535; H04N 5/14; H04N 3/22; H04N 5/22

[52] U.S. Cl. .................. 358/22; 358/180; 358/183; 358/160

[58] Field of Search .......... 358/22, 180, 287, 166, 358/160, 183

[56] References Cited

U.S. PATENT DOCUMENTS

| | | | |
|---|---|---|---|
| 4,063,280 | 12/1977 | Hattori et al. | 358/22 |
| 4,080,626 | 3/1978 | Hurst et al. | 358/160 |
| 4,127,873 | 11/1978 | Katagi | 358/166 |
| 4,134,128 | 1/1979 | Hurst | 358/22 |
| 4,139,860 | 2/1979 | Micic et al. | 358/22 |
| 4,220,965 | 9/1980 | Heitmann et al. | 358/22 |
| 4,227,215 | 10/1980 | Gurley et al. | 358/160 |
| 4,238,773 | 12/1980 | Tsuboka et al. | 358/183 |
| 4,249,211 | 2/1981 | Baba et al. | 358/183 |
| 4,249,213 | 2/1981 | Imaide et al. | 358/183 |
| 4,267,560 | 5/1981 | Ishikawa et al. | 358/22 |
| 4,278,993 | 7/1981 | Suzuki | 358/22 |
| 4,282,546 | 8/1981 | Reitmeier | 358/22 |
| 4,282,550 | 8/1981 | Coviello | 358/160 |
| 4,298,891 | 11/1981 | Baba et al. | 358/183 |
| 4,344,090 | 8/1982 | Belisomi et al. | 358/183 |
| 4,417,276 | 11/1983 | Bennett et al. | 358/160 |

OTHER PUBLICATIONS

T. P. Pulford et al., "An Electronic Zoom Facility for Television", *Electronic Engineering*, vol. 52, No. 639, Jun. 1980, pp. 20–22.

M. Masuda et al., "Fully Digitized Color Picture in Picture Television System", *IEEE Transactions on Consumer Electronics*, vol. CE-25, Feb. 1979, pp. 152–159.

S. Kreinik et al., "Multifunction Digital Video Processor", *Digital Video*, vol. 3, Jun. 1980, pp. 99–105.

K. Takemura, (Sharp Corp.), "Digitalization of TV Receivers", ITEJ, 1982, (translation-32 pages).

S. Ohr, "6-Bit Flash Converter Simplifies Software Needs for Robot Vision Systems", *Electronic Design*, Mar. 3, 1983, p. 37.

*Primary Examiner*—John C. Martin
*Assistant Examiner*—Michael Dunnam
*Attorney, Agent, or Firm*—E. M. Whitacre; P. J. Rasmussen; C. A. Berard, Jr.

[57] ABSTRACT

Apparatus providing a magnified picture display for a television receiver employs a reduced-size digital memory which stores only the digitized video signal components necessary to generate video signals to produce the magnified picture display. A simplified user-controlled picture positioning arrangement generates write and read addressing signals for the digital memory representative of both the picture area of the magnified picture display and of the normal picture display therein which is to be magnified. Writing of the digitized video signal components of the normal picture display into the digital memory is accomplished in "real time" whereas reading of the stored data from the memory and signal processing to develop interpolated digitized video signal components of the magnified picture is accomplished at a reduced processing rate on a line-by-line basis in between memory write cycles. User selection of discrete degrees of magnification and of freeze-frame (still) or continuously-updated (essentially real-time) displays is provided.

20 Claims, 15 Drawing Figures

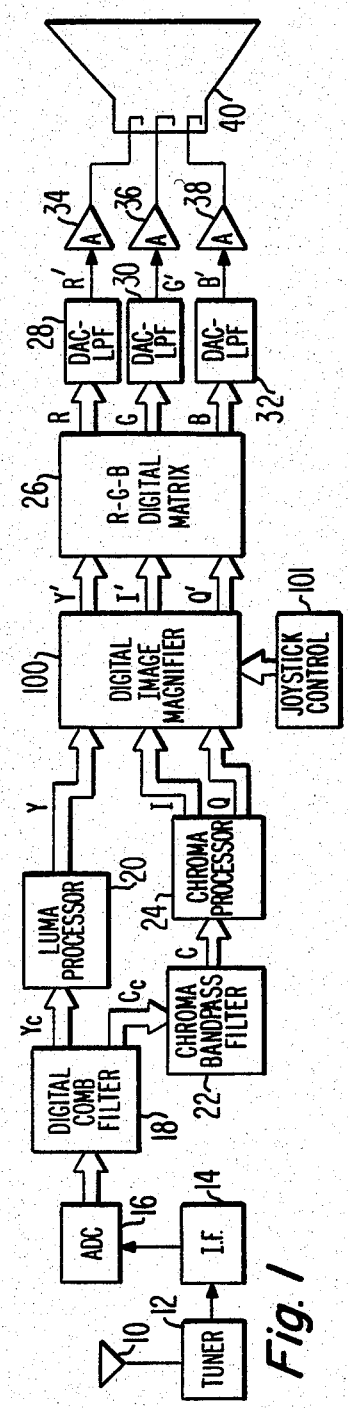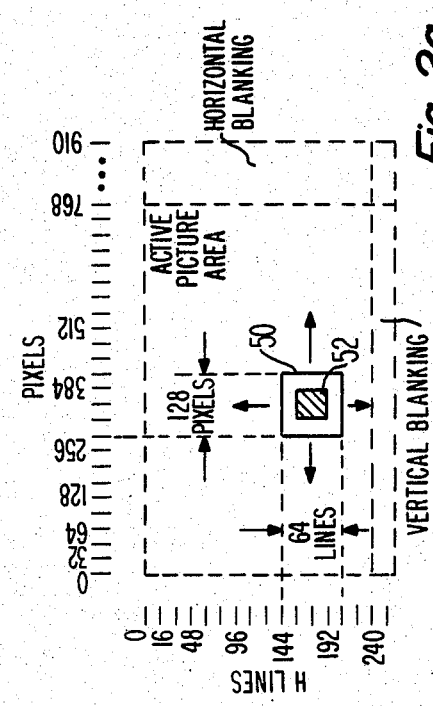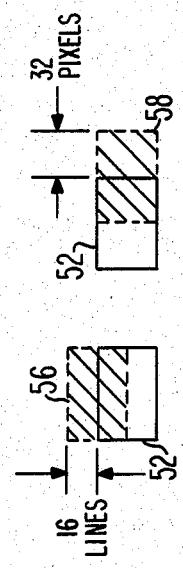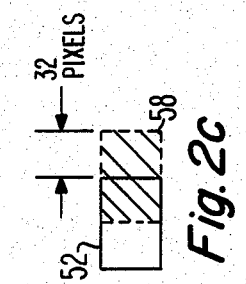

DIGITAL INTERPOLATOR 118

TELEVISION RECEIVER HAVING PICTURE MAGNIFYING APPARATUS

This invention relates to apparatus in a television receiver for providing a magnified display of at least a portion of a television picture.

Modern television (TV) studios include electronic television signal processing apparatus capable of providing many special effects such as slow motion stop-action, and picture-in-picture displays. Such apparatus is extremely complex and expensive and is therefore not suitable for use in a mass-produced, reasonably-priced television receiver. Moreover, the viewer has no control over the operation of the studio equipment and must accept the transmitted picture display.

A television viewer, however, may desire to view a particular scene more closely than is possible with a normal picture display. Thus, it is desirable for the viewer to be able to select and control magnification of a portion of the TV picture, for example, by a 2:1, 4:1 or 8:1 factor. In addition, it is desirable that the magnified display include a freeze-frame or stop-action feature as well as a continuously changing scene (continuous motion feature) corresponding to a portion of the received scene. These features can be particularly useful when the picture includes textual information such as that produced by a teletext decoder or by a home computer. It is recognized that apparatus for providing such features in a television receiver, in order to be commercially and economically feasible, must be relatively simple, reliable and low in cost.

SUMMARY OF INVENTION

To that end, in a television receiver of the present invention, apparatus modifies digital luminance and digital chrominance samples representative of an analog video signal for magnifying a predetermined image area by a factor equal to a power of two. A window generator positions the magnified image in a position selected by a user-actuated device. The digital luminance and digital chrominance samples are stored in a digital memory which is addressed in accordance with the selected position. An interpolator interpolates the stored digital luminance and digital chrominance samples to the desired magnification. A multiplexer applies the interpolated digital luminance and digital chrominance samples in place of the corresponding samples thereof within the magnified image area.

In the Drawing:

FIG. 1 is a schematic diagram in block diagram form of a television receiver including an embodiment of the present invention FIGS. 2a, 2b, 2c, 5, 8, 10 and 11 are representations of displays and signal waveforms useful in understanding the operation of the present invention, and FIGS. 3, 4, 6, 7, 9, 12 and 13 are schematic diagrams in block diagram form of embodiments of apparatus and portions thereof suitable for practicing the present invention.

In the drawings, broad arrows represent signals in the form of parallel digital data words, having eight bits unless otherwise indicated, and single-line arrows represent signals in the form of analog signals, digital levels, one-bit or serial digital data words. A small circle at the input to a circuit element, such as a gate or a counter, indicates that the circuit element responds to the logical inversion of that input signal. As used herein, higher numbered bits of a digital word are more significant bits thereof than are lower numbered bits thereof. Counters and flip flops are operative on the positive-going edges of signals unless stated otherwise.

The television receiver of FIG. 1 receives broadcast TV signals from antenna 10 or a CATV system (not shown) at its tuner 12 which translates a selected one of the TV signals to an intermediate frequency (IF) at which it is processed by IF processor 14. Processor 14 detects the video signal and provides a baseband analog video signal which is converted to corresponding digital samples by analog-to-digital converter ADC 16. The conversion rate of ADC 16 is greater than two times the maximum signal frequency of the baseband analog video signal, e.g., greater than 2×4.2 MHz for the NTSC system employed in the United States. It is convenient to employ a sampling signal $4f_{sc}$ at four times the color subcarrier frequency ($f_{sc}$) which is about 3.58 Mega Hertz (MHz) in the NTSC system and 4.43 MHz in the PAL system. Such sampling signals are developed by a phase-locked loop (not shown) which is locked in phase and frequency to the color burst signal component of the baseband video signal.

The digital video samples from ADC 16 are applied to digital comb filter 18 which separates the luminance component samples Yc from the chrominance component samples Cc. Luminance processor 20 processes luminance component samples Yc to produce digital luminance samples Y which are, for example, corrected for peaking, brightness and contrast. Chrominance component samples Cc are filtered by digital bandpass filter 22 to produce chrominance samples C which are separated into quadrature component samples, for example, I and Q, by chroma processor 24. Processor 24 provides, for example, tint and saturation correction and the automatic chroma control and color-killer functions. It is noted that the R-Y and B-Y quadrature chrominance component samples can be employed instead of the I and Q component samples without change to the apparatus of the present invention described herein except for redesignating I,Q to R-Y, B-Y.

Digital image magnifier 100 receives the Y, I and Q digital signals and develops digital signals Y', I' and Q' which represent either unmodified portions of digital signals Y, I and Q or portions thereof modified in accordance with the viewer's selection of magnification, continuous motion or stop-action. Viewer control is provided by joystick control 101 which is of the sort commonly employed with video games. A particular embodiment of magnifier 100 is described in detail below.

Digital RGB matrix 26 converts digital luminance samples Y' and digital chrominance samples I' and Q' into digital color samples R, G and B which are converted into analog signals R', G' and B', respectively, and low-pass filtered by DAC-LPFs 28, 30 and 32, respectively. These analog signals are amplified respectively by kine-driver amplifiers 34, 36 and 38 and are applied to the corresponding cathodes of kinescope 40 upon which the raster-scanned TV picture is displayed. Digital matrix 26 includes digital multipliers and adders arranged to perform the NTSC system transformation equations:

$R = Y + 0.95I + 0.62Q$, $G = Y - 0.27I - 0.65Q$, and $$B = Y - 1.10I + 1.70Q.$$

Digital image magnifier 100, shown in FIG. 3, includes normal/magnifier multiplexer 102 which selects either the normal image component samples Y, I, Q for digital signals Y', I', Q' or the magnified image digital samples $Y_M$, $I_M$, $Q_M$ therefor at times when a magnified portion of an image is to be displayed. Those times correspond to magnified picture window 50 shown in FIG. 2a which depicts a raster-scanned TV picture area for one field. It is convenient to select the magnified picture window 50 to be about one-sixth the width of the active picture area and about one-fourth the height thereof. It is preferred that the selection be made to include numbers of picture elements which are integer powers of two.

The picture area is divided horizontally into 910 pixels, each of which corresponds to one cycle of the $4f_{sc}$ sampling signal. The first 768 pixels are within the active picture area and pixels 768–910 are within the horizontal blanking interval. This is convenient because the window 50 having one-sixth the width of the active picture area includes 128 pixels, 128 conveniently being a power of two (i.e. $2^7$). At 2:1 magnification the picture area 52 to be magnified is 64 pixels wide (i.e. $2^6$ pixels).

Vertically, each 525 line frame of the raster includes two fields of $262\frac{1}{2}$ lines each, of which the active picture area includes about 242 lines. This is convenient because the magnified picture window 50 including 64 horizontal lines per field (128 lines per frame) has a height about one-fourth that of the active picture area. At 2:1 magnification the picture area 52 to be magnified is 32 lines high per field (64 lines per frame) of the raster.

It is noted that magnified picture window 50 and window 52 to be magnified are concentric and can be moved either up, down, left or right as indicated by the arrows in FIG. 2a. So that overlap between selectable windows is sufficient to ensure satisfactory viewer choice in positioning windows 50 and 52, the vertical movement step size is one-half the height of the window, i.e., 16 lines per field as shown in FIG. 2b between window 52 in a first location and in a next location 56. Similarly, windows 50 and 52 can be moved horizontally in steps of one-half their width, i.e., 32 pixels as shown in FIG. 2c between window 52 in a first location and in a next location 58. As used herein, the term "line" generally refers to the time between any two vertically aligned points on adjacent scan lines of the raster. Thus, a line can be between, for example, the edge of read window 50 on one scan line and the same edge thereof on the next scan line. The term "scan line" generally indicates the "line" time corresponding to the actual left to right scan and retrace of the electron beam of kinescope 40. The term line is therefore more inclusive and can indicate the time between pulses of read window signal RWS or write window signal WWS (described below) as well as a scan line.

Returning to FIG. 3, the position of windows 50, 52 is selected by the TV viewer employing joystick control 101 to increment or decrement horizontal and vertical positioning apparatus of window generator 104. In response thereto, generator 104 develops write window signal WWS representative of the boundaries of write window 52, and read window signal RWS representative of the boundaries of read window 50.

Digital sample components Y, I, Q are passed through noise reducer 106 as digital signals $Y_I$, $I_I$, $Q_I$, respectively, which are applied to the respective data inputs of luminance random access memory Y RAM 108, and chrominance random access memories I RAM 110 and Q RAM 112. Write address generator 114 responds to write window signal WWS to generate addresses for RAMs 108, 110, 112 such that only the 64 pixels for the 64 lines (32 lines per each of the two fields) in write window 50 in a TV frame are stored. This desirably reduces the size, and therefore the cost, of the required memories.

In addition, the memory requirements are further reduced because the digital chrominance signals $I_I$ and $Q_I$ are stored at a data rate of only $f_{sc}$ which is sufficient to satisfy the Nyquist sampling criteria consistent with their maximum respective maximum bandwidths of about 1.2 and 0.5 MHz. Digital luminance signal $Y_I$ is stored at a $4f_{sc}$ data rate in view of its 4.2 MHz maximum bandwidth. As a result, the memory requirements are reduced to the minimum storage sufficient to develop the magnified image. It is important to note that RAMs 108, 110, 112 need store only actual pixel data points within write window 50 thereby being of minimum storage capacity. Accordingly, a 4096-word×8-bit RAM is satisfactory for Y RAM 108 and 1024-word×8-bit RAMs are satisfactory for each of I and Q RAMS 110, 112.

Read address generator 116 responds to read window signal RWS to generate read addresses for RAMs 108, 110, 112 such that the digital data stored therein, which correspond to pixels within read window 50, are applied to digital interpolator 118. As will be explained in detail below, digital data $Y_0$, $I_0$, $Q_0$ is transferred to interpolator 118 for each of the 64 lines between the upper and lower boundaries of read window 50 but during the time within each of those lines which is between successive occurrences of read window 50, i.e. outside the left- and right-hand boundaries thereof. During that time for each such line, interpolator 118 is addressed by read address generator 116 to develop the pixels and lines necessary to form the magnified picture field portion (128 pixels×2 lines) from the stored digital data (64 pixels×1 line). Thereafter, during the time between the left and right boundaries of read window 50, the interpolated magnified digital line data $Y_M$, $I_M$, $Q_M$ produced by interpolator 118 is selected by multiplexer 102 as the digital video signals Y', I', Q', respectively.

It is important to note that the foregoing arrangement of RAMs 108, 110, 112, address generator 116 and interpolator 118 cooperates to minimize the capacity required in the memories of RAMs 108, 110, 112 and the buffer memories of interpolator 118 described below. This arrangement avoids the need for dual memories to alternately write and read because data is written into RAMs 108, 110, 112 only during write window 52 and is read therefrom only during times outside of read window 50. Moreover, because data is transferred from RAMs 108, 110, 112 to interpolator 118 at times outside of read window 50 on a line-by-line basis, the buffer memories of interpolator 118 are not required to write and read simultaneously and are of minimum size corresponding to only one line of interpolated pixel data within read window 50.

FIG. 3 further shows clock generator 120 which responds to the video signals to develop a horizontal blanking pulse HB, vertical blanking pulse VB, and sampling signal $4f_{sc}$ at four times the color subcarrier frequency $f_{sc}$. In addition, clocking signals at $2f_{sc}$, $f_{sc}$, $f_{sc}/2$ and the like are developed by conventional digital countdown circuits. Clock generator 120 can employ circuitry similar to either that used in analog TV receivers or that used in digital TV receivers.

Figure 4:
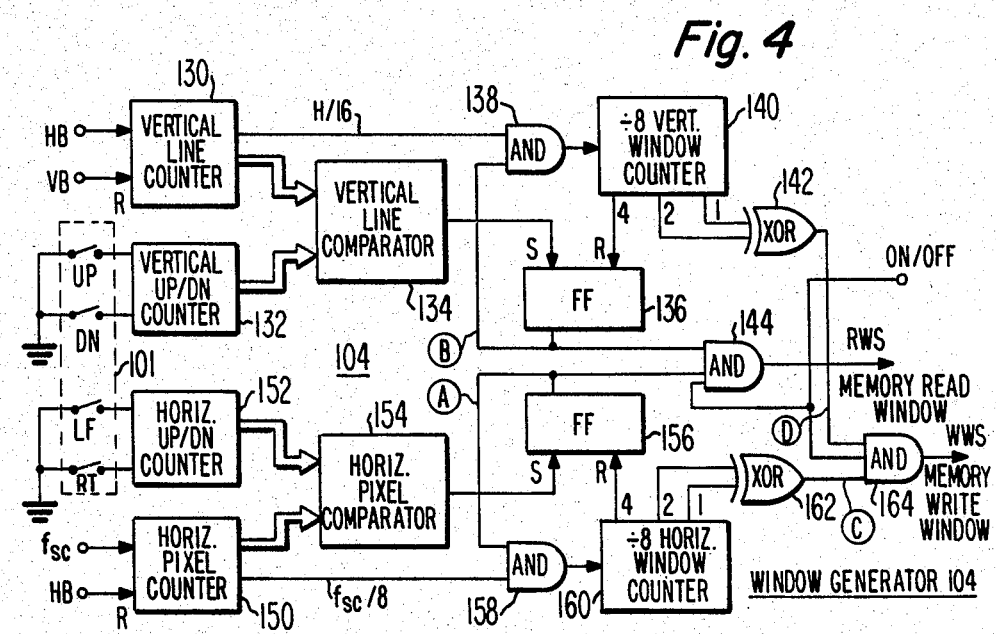

Window generator 104, shown in detail in FIG. 4, positions the magnified image within the active picture area. Viewer-actuated switches UP and DN of joystick control 101 are closed to respectively increment and decrement four-stage up-down counter 132 which provides a four-bit parallel digital word having $2^4=16$ states corresponding to the sixteen vertical positions of the magnified image. Vertical line counter 130 is reset by the vertical blanking signal VB and includes a divide-by-sixteen counter responsive to the horizontal blanking signal HB to produce an H/16 frequency signal which is applied to AND gate 138. Line counter 130 further includes a four-stage counter responsive to the H/16 signal to provide a four-bit parallel digital word having $2^4-16$ corresponding to the sixteen vertical positions of the magnified image.

Figure 5:
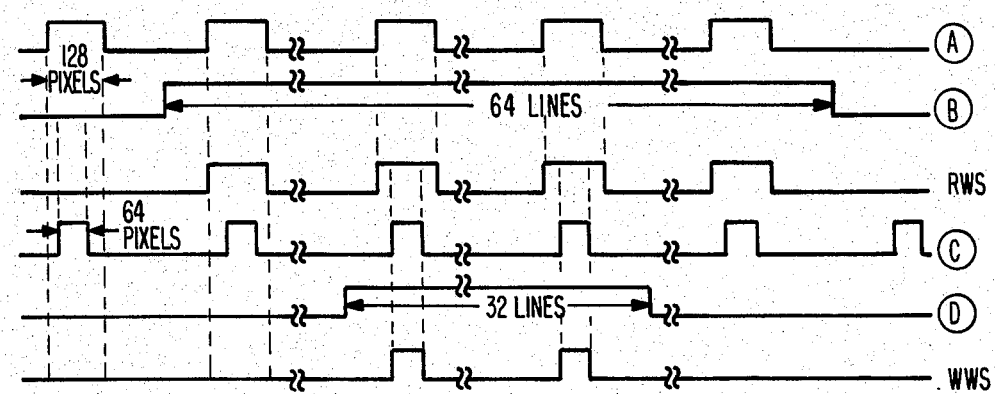

Vertical line comparator 134 produces a signal to set flip flop 136 when the digital word from line counter 130 has increased so as to equal the digital word from up-down counter 132. Flip flop 136 being set enables AND gate 144 for the duration of the vertical read window thereby establishing the beginning vertical boundary of the read window, i.e. the horizontal line defining the top edge of read window 50 of FIG. 2a. Waveform B of FIG. 5 is the output of flip flop 136. Flip flop 136 being set also enables AND gate 138 which thereby begins to apply the H/16 signal to divide-by-eight vertical window counter 140. Exclusive OR gate 142 detects the states 01 and 10 of the $2^0=1$ and $2^1=2$ bits from counter 140 to enable AND gate 164 for the duration of the vertical write window, i.e. the 32 horizontal lines between the top and bottom edges of write window 52 of FIG. 2a. Waveform D of FIG. 5 is the output of XOR gate 142. When window counter 140 advances to state 100 after four cycles of the H/16 signal, the $2^2=4$ bit from counter 140 resets flip flop 136 to disable AND gate 144 terminating waveform B of FIG. 5. Thus, waveform B has a pulse duration of 64 lines corresponding to the 64 lines between the top and bottom edges of read window 50 of FIG. 2a and waveform D has a pulse duration of one-half as many lines centered within the duration of waveform B.

Viewer-actuated switches LF and RT of joystick control 101 are closed to respectively increment and decrement horizontal up-down counter 152 which provides a five-bit parallel digital word having states corresponding to the 24 horizontal positions of the magnified image. Horizontal pixel counter 150 is reset by the horizontal blanking signal HB and includes a divide-by-eight counter responsive to the subcarrier clock $f_{sc}$ to produce a frequency signal $f_{sc}/8$ which is applied to AND gate 158. Each cycle of the $f_{sc}/8$ signal corresponds to 32 cycles of the $4f_{sc}$ sampling clock, i.e. to 32 pixels. Pixel counter 150 further includes a five-stage counter responsive to the $f_{sc}/8$ signal to provide a five-bit parallel digital word having states corresponding to the 24 horizontal positions of the magnified image. When up-down counter 152 and the five-stage counter of pixel counter 150 are binary counters, each has $2^5=32$ states of which states 1-24 are designated to correspond to the 24 horizontal image positions.

Horizontal pixel comparator 154, flip flop 156, AND gate 158, horizontal window counter 160 and exclusive OR gate 162 operate analogously to vertical line counter 134, flip flop 136, AND gate 138, vertical window counter 140 and exclusive OR gate 142 described above. Flip flop 156 produces waveform A of FIG. 5 which has a pulse duration of 128 pixels corresponding to the 128 pixels between the left and right edges of read window 50 of FIG. 2. Exclusive OR gate 162 produces waveform C of FIG. 5 which has a pulse duration of 64 pixels centered within the duration of waveform A.

AND gate 144 detects coincidence of waveforms A and B to produce memory read window signal RWS, and AND gate 164 detects coincidence of waveforms C and D to produce memory write window signal WWS, both shown in FIG. 5. RWS and WWS define times corresponding to the vertical and horizontal boundaries of read window 50 and of write window 52, respectively. Respective third inputs to AND gates 144 and 164 provide for ON/OFF control of the display magnification feature—magnification is provided when the ON/OFF line is a high logic level and a normal picture display is provided when that line is a low level.

Figure 6:
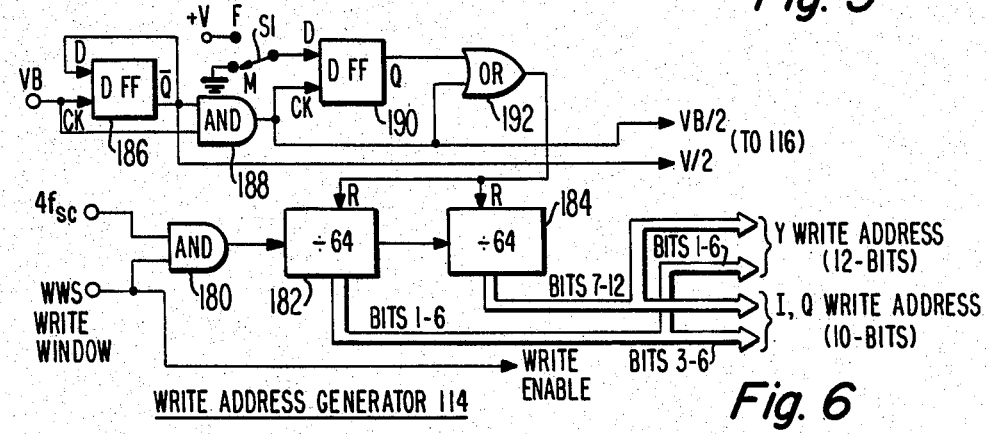

Write address generator 114, shown in detail in FIG. 6, develops a write enable signal and write addresses for memories Y RAM 108, I RAM 110 and Q RAM 112 so that input data $Y_I$, $I_I$ and $Q_I$, respectively, are written therein during portions of lines within memory write window 52. AND gate 180 passes the sampling signal $4f_{sc}$ to cascade-connected divide-by-sixty-four counters 182 and 184 when it is enabled by write window signal WWS. Counters 182 and 184 are reset via OR gate 192 at the beginning of every frame (i.e. alternate fields) by toggle-connected type D flip flop 186 and AND gate 188 which merely replicate every other vertical blanking signal VB (at least when switch S1 is in position M). Counters 182 and 184 count the $4f_{sc}$ sampling signal to develop a twelve-bit parallel word which serves directly as the Y write address for Y RAM 108 of FIG. 3. The ten most significant bits of the 12-bit word (i.e. bits 7-12 from counter 184 and bits 3-6 from counter 182) serve as the 10-bit I and Q write addresses for both I RAM 110 and Q RAM 112 of FIG. 3.

Switch S1 being in position M provides a continuously updating mode of operation of display magnifier 100 since flop flop 190 applies a low level to OR gate 192. This enables write address generator 114 to develop write addresses so that the stored picture data is updated every frame as is the magnified image produced therefrom. Thus, the magnified image displayed within the active picture corresponds to and changes along with the information of the active picture, albeit delayed by one field time.

A freeze-frame (stop-action) magnified image is produced after S1 is thrown to position F. On the next alternate one of vertical blanking signals VB, the high level $+V$ applied to the D input of flip flop 190 is clocked to its output Q by the replicated blanking signal VB/2 produced by AND gate 188 thereby applying a high level via OR gate 192 to hold counters 182 and 184 reset. With counters 182 and 184 held reset, no write addresses are developed so no new data are stored in memories 108, 110 and 112 and the data previously stored therein are repeatedly read out to produce a magnified still image. Odd/even field signal V/2 from the Q output of flip flop 186 and alternate vertical blanking signal VB/2 from AND gate 188 are also supplied to read address generator 116.

Figure 7:
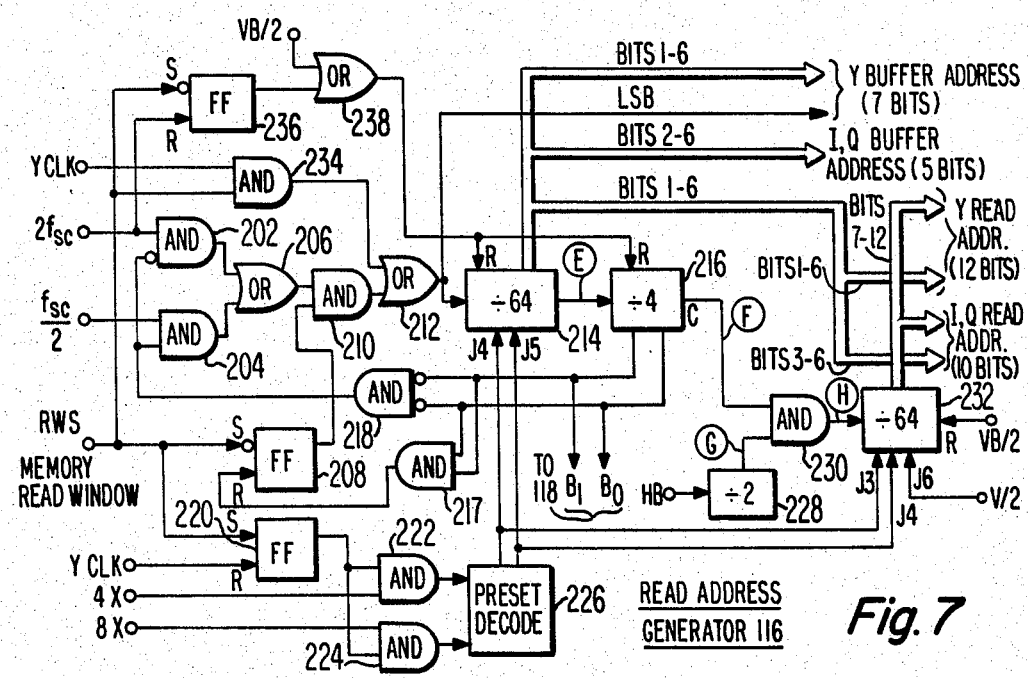

Read address generator 116, shown in detail in FIG. 7, develops read addresses for memories Y RAM 108, I RAM 110 and Q RAM 112 so that output data $Y_0$, $I_0$ and $Q_0$ are applied to digital interpolator 118. Read address generator 116 also develops addresses for digital interpolator 118 so that magnified interpolated data $Y_M$, $I_M$ and $Q_M$ and are applied to normal/magnifier multiplexer 102. In operation read address generator 116 actually develops one 12-bit address word of which different bits are employed to address different memory structures at different times for different purposes.

The lesser significant bits of the address words are produced by counter 214 to correspond to pixel (horizontal) positions of the portions of one scan line within read window 50 to whereas the more significant bits thereof are produced by counter 232 to correspond to the portions of scan lines (vertical) positions within the two fields (one frame) of window 50. In operation, four complete cycles of the pixel (horizontal) portion of the address words occur during the time between the end of one read window signal RWS and the beginning of the next one thereof. These four repetitions correspond to the sequential operations: (1) read, interpolate and store luminance (Y) samples; (2) read, interpolate and store the chrominance I samples; (3) read, interpolate and store the chrominance Q samples; and (4) then simultaneously produce all of the stored, interpolated Y, I and Q samples during the read window 50. The vertical portions of the address words are incremented only on alternate lines since the 2:1 magnified image will include interpolated lines. This operation will now be described in detail with reference to FIGS. 7 and 8. Counters 214, 216 and 232 are reset via OR gate 238 on alternate vertical blanking signals VB/2 supplied from write generator 114.

Between occurrences of read window 50, generator 116 develops address words at a $f_{sc}/2$ rate for transferring one line of luminance data (i.e. 64 pixels at 2:1 magnification) from RAM 108 to digital interpolator 118 and at a $2f_{sc}$ rate for transferring one line of I and one line of Q data (i.e. 16 pixels each at 2:1 magnification) from RAMs 110, 112 to interpolator 118 as follows. The trailing edge of memory read window RWS which occurs at the right edge of read window 50 sets flip flops 236 and 208 to reset, via OR gate 238, divide-by-sixty-four counter 214 and divide-by-four counter 216 and to enable AND gate 210, respectively. Flip flop 236 is then reset by clocking signal $2f_{sc}$ releasing the reset of counters 214 and 216. Because counter 216 is reset, AND gate 218 enables AND gate 204 and disables AND gate 202. Thus, the clocking signal $f_{sc}/2$ is applied through AND gate 204, OR gate 206, AND gate 210 and OR gate 212 to counter 214. After 64 cycles of $f_{sc}/2$ are applied to counter 214, counter 216 is advanced by signal E shown in FIG. 8. Counter 214 no longer being reset is detected by AND gate 218 which reverses the selection of clocking signals by AND gates 202 and 204 so that clocking signal $2f_{sc}$ is now applied to counter 214. After the 64 count cycle of counter 214 has repeated twice more for the I and Q data samples, counter 216 is advanced to a count of three which produces coincidence at AND gate 217 which resets flip flop 208 to disable AND gate 210 thereby blocking clocking signals $2f_{sc}$ and $f_{sc}/2$ from being applied to counter 214.

Figure 8:
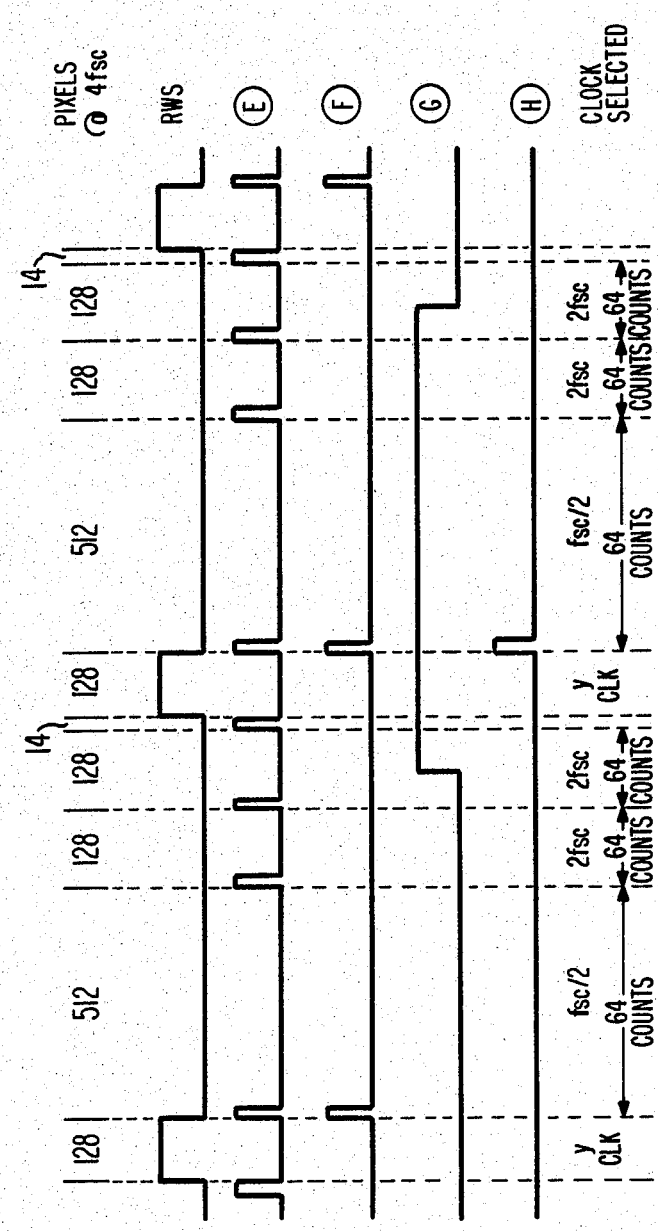

At this point in the operation, counter 214 has produced three complete cycles of the portion of the address words corresponding to pixel (horizontal) positions, as indicated at the bottom of FIG. 8. It is noted that the 64 luminance samples are produced from Y RAM 108 at the $f_{sc}/2$ clocking rate and that the 16 I and 16 Q samples are also produced at an $f_{sc}/2$ rate owing to the effective division by four implicit in limiting the I and Q address words to ten bits, as described below.

Thereafter, during the occurrence of read window 50, generator 116 develops read addresses at the rate of a clocking signal Y CLK which is applied to counter 214 via AND gate 234 and OR gate 212. The generation of signal Y CLK is described below. For 2:1 magnification, signal Y CLK is at the frequency $4f_{sc}$ so that counter 214 counts through sixty-four exactly once to again produce bits of the address words corresponding to pixel (horizontal) positions, in which address words the signal Y CLK serves as the LSB. After four counts of signal E, counter 216 develops a carry pulse F of FIG. 8 at its C output which is applied to AND gate 230. The horizontal blanking signal HB is divided by two in counter 228 to enable AND gate 230 on alternate lines. As a result, divide-by-sixty-four counter 232 is incremented to advance the vertical line indicating portions of the address words only on alternate lines, as shown by waveforms G and H of FIG. 8. For odd-numbered fields, the range of vertical addresses developed by counter 232 is 0 to 31. For even-numbered fields. preset input J6 of counter 232 receives a high logic level provided by signal V/2 from write address generator 114 to preset counter 232 to make the range of addresses 32 to 63.

Particular address words are formed from the output bits of counters 214 and 232 as follows. The twelve-bit Y read address words for Y RAM 108 consist of the six bits produced by counter 214 as the six least significant bits and the six bits produced by counter 232 as the six most significant bits. The ten-bit I, Q read address words for I RAM 110 and Q RAM 112 consist of the six bits produced by counter 232 as the six most significant bits and the four most significant of the six bits produced by counter 214 as the four least significant bits.

Shorter address words are developed for digital interpolator 118 which operates on a line-by-line basis. Interpolator 118 includes Y buffer 260, I buffer 262 and Q buffer 264 which are described below. The seven-bit Y buffer address words for Y buffer 260 consist of the six bits produced by counter 214 as the six most significant bits and the input clocking signal to counter 214 as the least significant bit, thereby developing two Y buffer address words for each Y read address word to permit the Y buffer to store both the $Y_0$ signal data from Y RAM 108 and interpolated pixel data. The five-bit I, Q buffer address word for I buffer 262 and Y buffer 264 consist of the five most significant of the six bits produced by counter 214.

The arrangement of read address generator 116 thus far described is satisfactory where 2:1 magnification is desired. Greater magnification requires adjustment to the ranges of the various address words developed during read window 50. This is so because the size of the magnified picture area (read window) 50 is unchanged while the magnification of the image displayed therein is increased. Thus, only selected portions of the interpolated data stored in Y, I and Q buffers 260, 262, 264 are produced when 4:1 and 8:1 magnification is selected.

To that end, memory read window signal RWS sets flip flop 220 which enables AND gates 222 and 224 to apply whichever one of magnification level indicative signals 4× or 8× may be present to preset decoder 226. When the 4× magnification signal is present, decoder 226 presets the preset inputs J4 of counter 214 and J3 of counter 232 to zeros and presets the preset inputs J5 of counter 214 and J4 of counter 232 to ones. When the 8× magnification signal is present, decoder 226 presets the J4 and J5 preset inputs of counter 214 and the J3 and J4 preset inputs of counter 232 to ones.

The Y CLK signal is at $4f_{sc}$ for 2:1 magnification, at $2f_{sc}$ for 4:1 magnification and at $f_{sc}$ for 8:1 magnification. Thus, during odd fields, vertical lines 0–31 are displayed within read window 50 once each the 2× magnified image, lines 8–23 twice each in the 4× image and lines 12–19 four times each in the 8× image. During even fields, lines 32–63 are displayed once each in the 2× image, lines 40–55 twice each in the 4× image, and 44–51 four times each in the 8× image. Similarly for a horizontal line within read window 50, pixels 0–127 are displayed once each in the 2× image, pixels 32–95 twice each in the 4× image, and pixels 48–79 four times each in the 8× image.

Figure 9:
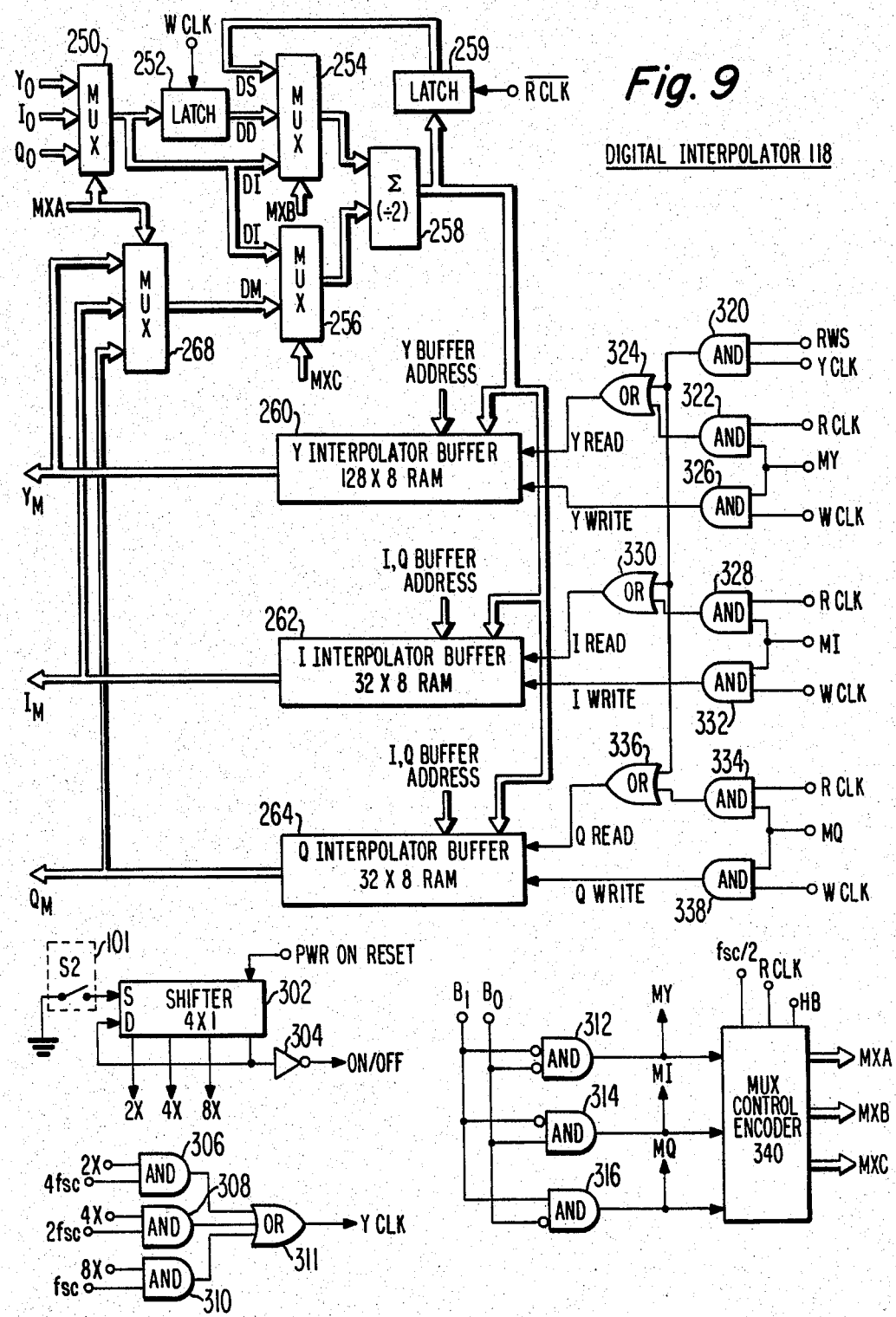

Digital image interpolator 118, shown in detail in FIG. 9, interpolates, stores and produces Y, I and Q samples on a line-by-line basis, at least for lines within read window 50. The following description of the structure of interpolator 118 is followed by a description of its operation. Two bits $B_0$, $B_1$ from counter 216 of FIG. 7 are decoded by AND gates 312, 314 and 316 to produce the signals MY, MI, MQ shown in FIG. 10 which indicate the sequence in which the $Y_M$, $I_M$ and $Q_M$ samples are to be interpolated during the interval between occurrences of memory read signal RWS.

Figure 10:
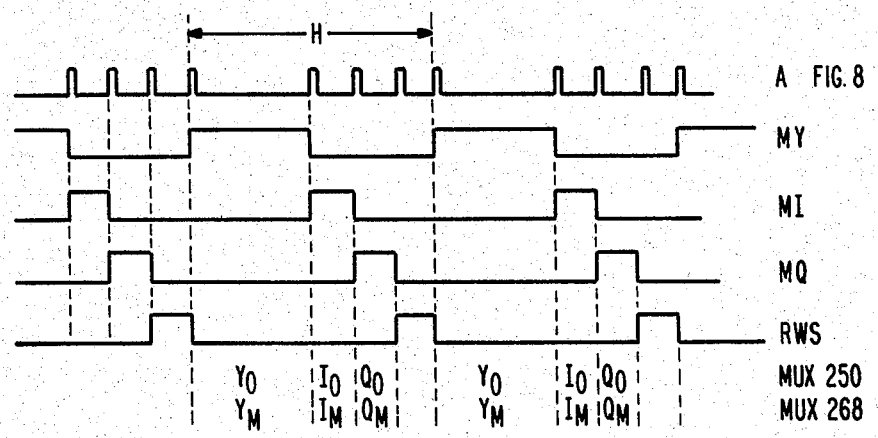

MUX control encoder 340 produces multiplexer (MUX) selection signal MXA in response to signals MY, MI and MQ. Selection signal MXA causes multiplexer (MUX) 250 to select $Y_0$ and multiplexer 268 to select $Y_M$ when MY is a high level, causes MUX 250 to select $I_0$ and MUX 268 to select $I_M$ when MI is a high level, and causes MUX 250 to select $Q_0$ and MUX 268 to select $Q_M$ when MQ is a high level, as indicated at the bottom of FIG. 10. In addition, signals MY, MI and MQ are combined with buffer write clocking signal W CLK by AND gates 326, 332 and 338, and with buffer read clocking signal R CLK by AND gates 322, 328, and 334 so that Y buffer 260, I buffer 262 and Q buffer 264 write and read during times MY, MI and MQ, respectively. This arrangement provides for sequential interpolation of a line of Y samples followed by a line of I samples and a line of Q samples. As a result, one interpolation circuit serves all three sample types so as to beneficially reduce the complexity of the circuitry required.

Thereafter, $Y_M$, $I_M$ and $Q_M$ are applied to multiplexer 102 at a rate determined by the clocking signal Y CLK. Read window signal RWS enables AND gate 320 to apply signal Y CLK to Y buffer 260 via OR gate 324, to I buffer 262 via OR gate 330, and to Q buffer 264 via OR gate 336 during read window 50. Y CLK is developed by AND gates 306, 308 and 310 and OR gate 311 of FIG. 9. Thus, in conjunction with the generation of address words by generator 116 as described above, for 2× magnification, all stored interpolated samples $Y_M$, $I_M$ and $Q_M$ are produced at a $4f_{sc}$ rate; for 4× magnification, the middle one-half of the samples are produced at a $2f_{sc}$ rate; and for 8× magnification, the middle one-quarter of the samples are produced at an $f_{sc}$ rate.

Y interpolator buffer 260 is a 128×8 bit RAM which receives 8-bit input data words from adder 258 which are written into the memory register addressed by the Y buffer address signal from read address generator 116 when the Y WRITE signal is a high level. Buffer 260 produces data word $Y_M$ from the memory register addressed by the Y buffer address signal when the Y READ signal is high. I interpolator buffer 262 and Q interpolator buffer 264 are each 32×8 bit RAMS which operate in analogous manner to Y buffer 260 except in response to the corresponding read, write and address signals designated I and Q, respectively.

The interpolations performed by latch 252, multiplexers 254 and 256, and adder 258 will now be described in relation to FIGS. 9 and 11, which description is applicable to whichever of the Y, I or Q samples are selected by MUXs 250 and 268 as described above. Pixels within odd lines are interpolated to expand the stored samples into twice as many interpolated samples. A clock generator (e.g. 120 of FIG. 3) develops a read clock signal R CLK and a write clock signal W CLK from the $4f_{sc}$ sampling clock. Signals R CLK and W CLK are phased as shown in FIG. 11 relative to the $2f_{sc}$ clock which corresponds to the rate of production of stored data samples at the output of MUX 250.

Figure 11:
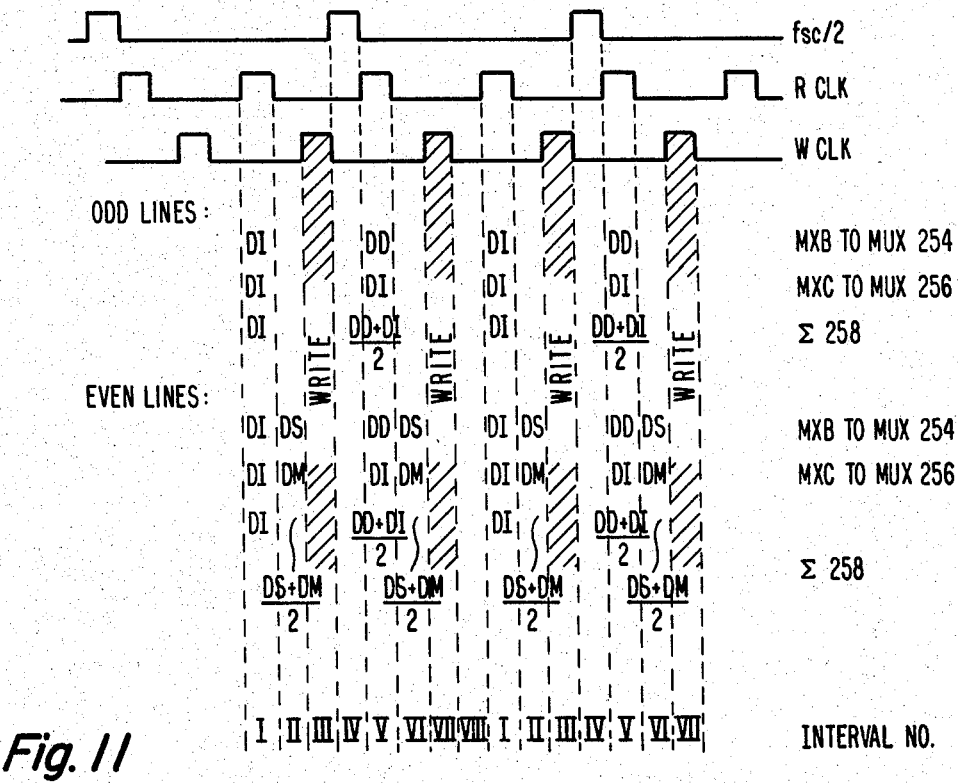

MUX control encoder 340 develops control signal MXB which is applied to MUX 254 to cause it to select current input samples DI during each interval I of FIG. 11, to select delayed input samples DD during each interval V, and to select input samples DS during intervals II and VI of even lines only. Encoder 340 further develops control signal MXC which is applied to MUX 256 to select current input samples DI during each of intervals I and V and to select magnified samples DM during intervals II and VI of even lines only. These selections are indicated in FIG. 11. Adder 258 receives the samples selected by MUXs 254, 256 as input samples and produces the average of them. This is conveniently accomplished for two eight-bit input samples which produce a nine-bit output sum by discarding the least significant bit of the sum and using only the eight remaining bits thereof, i.e. the output is effectively divided by two as a result of the equivalent of a shift of a binary number one place to the right.

The above description of the interpolation apparatus 118 will be better understood by considering its operation. For odd-numbered lines within read window 50, only horizontal (pixel-to-pixel) interpolation is performed. In the following description, data samples are designated with subscripts "xy" where "x" is the line number of the stored line of write window 52 and "y" is the pixel number therein. Each of MUXs 254 and 256 cause the current (first) input sample $DI_{11}$ to be applied to adder 258 which produces the average $(DI_{11}+DI_{11})/2 = DI_{11}$ in interval I which is written into the appropriate buffer 260, 262 or 264 in interval III. This pixel represents an actual pixel value which is unaffected by the interpolation processing. Current (first) input $DI_{11}$ is latched in response to signal W CLK by latch 252 which produces it thereafter as delayed signal $DD_{11}$. In interval V, MUX 254 applies delayed signal $DD_{11}$ to adder 258 while MUX 256 applies the now current (second) input signal $DI_{12}$ thereto. Adder 258 produces the average of the first and second samples $(DD_{11}+DI_{12})/2 = (DI_{11}+DI_{12})/2$ which is stored in the appropriate buffer in interval VII. This pixel represents a horizontally interpolated pixel developed from two horizontally adjacent actual pixel values. In the next occurrences intervals I and III, the average $(DI_{12}+DI_{12})/2 = DI_{12}$ of an actual pixel is computed and stored. In intervals V and VII next occurring, the average $(DD_{12}+DI_{13})/2 = (DI_{12}+DI_{13})/2$ of a horizontal interpolated pixel is computed and stored. Thus, two data samples are stored for each data sample DI received. The interpolated samples intermediate actual data samples being developed by averaging the values of the immediately preceeding and the immediately following samples. This interpolation process is completed for one line each of $Y_M$, $I_M$ and $Q_M$ which are then read from buffers 260, 262, 264 to display a line of the magnified image during read window 50 according to read window signal RWS.

For even-numbered lines, not only is a horizontal (pixel-to-pixel) interpolation performed, but vertical (line-to-line) interpolation is also performed. The input data DI now corresponds to the next line of stored information provided from one of RAMs 108, 110, 112. During interval I, the average $(DI_{21}+DI_{21})/2=DI_{21}$ is developed by adder 258 and is stored in latch 259 responsive to $\overline{R\,CLK}$ at the end of interval I. This sample represents an actual pixel which is unaffected by the interpolation processing. During interval II, MUX 254 selects stored sample $DS_{21}$ which is $DI_{21}$ from latch 259 and MUX 256 selects $DM_{21}$ which is $DI_{11}$ developed and stored in the appropriate buffer 260, 262, 264 during the previous (odd-numbered) line. Adder 258 develops the average $(DS_{21}+DM_{21})/2=(DI_{11}+DI_{21})/2$ as the first pixel of the interpolated even-numbered line which is written during interval III into the appropriate buffer in the addressed register from which $DI_{11}$ was produced. This pixel represents a vertically interpolated pixel developed from two vertically adjacent actual pixel values. During interval V, an interpolated pixel $(DD_{21}+DI_{22})/2$ is developed as described above and is stored by latch 259 as $DS_{22}$. During interval VI, MUX 254 selects $DS_{22}$ and MUX 256 selects $DM_{22}$ from the appropriate buffer so that adder 258 develops pixel $(DS_{22}+DM_{22})/2$ which is written into the appropriate buffer during interval VII. This pixel represents a vertically interpolated pixel developed from two vertically adjacent pixel values which have been each horizontally interpolated from two horizontally adjacent actual pixel values.

This interpolation process continues until a complete interpolated line of Y, I, and Q samples is developed and stored in buffers 260, 262, 264 after which they are read therefrom to display an interpolated line of the magnified image according to RWS. It is noted that for the next occurring odd-numbered line, the address words for Y RAM 108, I RAM 110 and Q RAM 112 will not have advanced so that the same pixel values which were interpolated in intervals I and V of the even-numbered line will again be interpolated for this odd-numbered line. This reprocessing is not disadvantageous but is in fact advantageous because buffers 260, 262 and 264 need only store one line of interpolated data and the addressing of those buffers and of RAMS 108, 110, 112 is simplified.

FIG. 9 further shows an arrangement for convenient viewer control of magnification. On a joystick control 101 of the sort used with video games, viewer-actuated switch S2 is the push button thereon, for example, whereas switches UP, DN, LF, RT shown in FIG. 4 correspond to the four directions of the joystick movement. Upon turning on of the TV receivers, four-stage by one-bit shift register 302 is reset by a power on reset signal to have zero bits in its first three stages and a one bit in its fourth stage. The one from the fourth stage is inverted by inverter 304 to provide the ON/OFF signal, the application of which was described above in relation to FIG. 4. The output from the fourth stage is coupled to data input D of shift register 302 to form a ring counter. Each closure of switch S2 applies a signal to shift input S of shift register 302 to shift the one bit into the next stage. Successive closures of S2 thus develop signals $2\times$, $4\times$, $8\times$ and ON/OFF in sequence wherein the signals $2\times$, $4\times$ and $8\times$ correspond to $2\times$ magnification, $4\times$ magnification and $8\times$ magnification of the inset image in read window 50.

Figure 12:
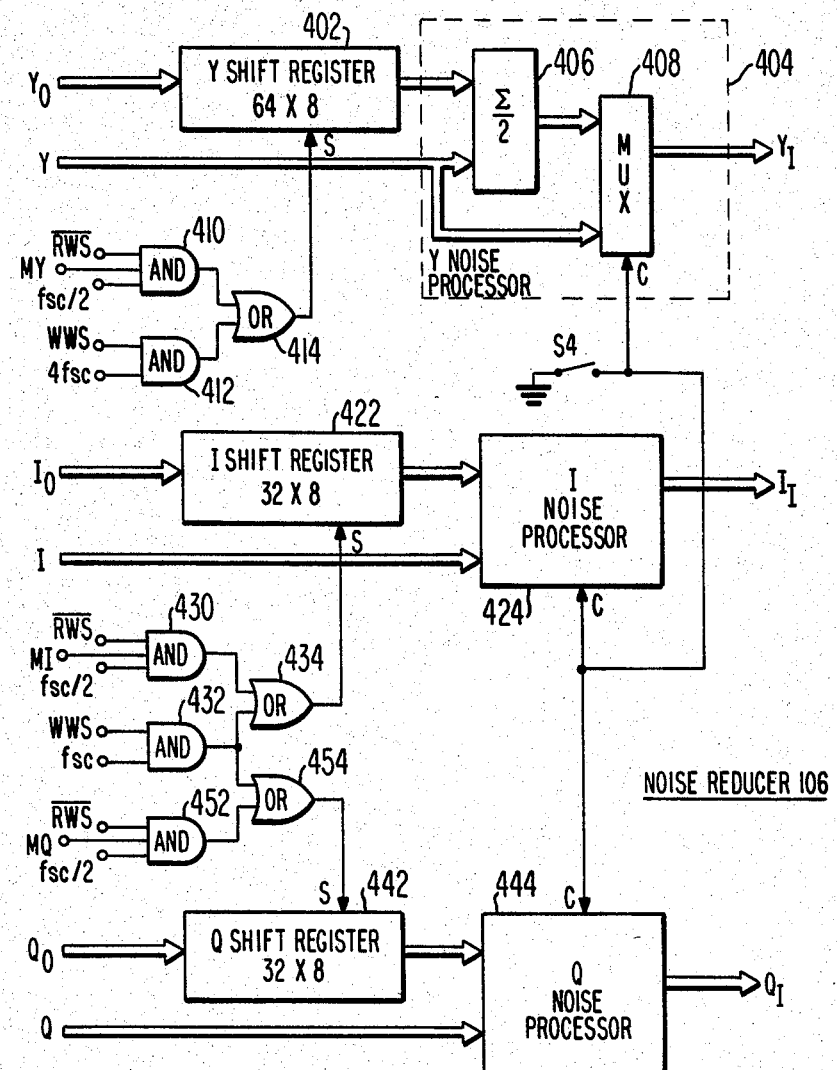

Noise reducer 106, shown in detail in FIG. 12, when actuated by closure of switch S4, averages pixel values of subsequent fields so as to reduce the effects of noise. $Y_0$, $I_0$ and $Q_0$ data are sequentially acquired by noise reducer 106 simultaneously with that data being transmitted to interpolator 118 between occurrences of read window 50. Sixty-four stage Y shift register 402 receives the sixty-four pixels of $Y_0$ data as they are transmitted from Y RAM 108 to interpolator 118. The $Y_0$ data is shifted into register 402 by the $f_{sc}/2$ clock signal applied via OR gate 414 when AND gate 410 is enabled by the inverse of read window signal RWS and the Y control signal MY from interpolator 118. Similarly, thirty-two stage shift registers 422 and 442 receive $I_0$ and $Q_0$ data from I RAM 110 and Q RAM 112 in accordance with OR gates 434 and 454 and the enabling of AND gates 430 and 452, respectively.

When switch S4 is open so that noise reducer 106 is not operative, multiplexer 408 of Y noise processor 404 merely passes the Y samples as the $Y_I$ samples. Counterpart multiplexers in I and Q noise processors 424 and 444 similarly pass I and Q samples as the $I_I$ and $Q_I$ samples in this condition. This is the condition described above in relation to FIG. 3.

To engage the noise reduction feature, switch S4 is closed to apply a ground level signal to control inputs C of processors 404, 424 and 444. This controls multiplexer 404 to select the output from adder 406 as the $Y_I$ samples; counterpart multiplexers and adders in processors 424 and 444 operate similarly. The samples previously stored in shift register 402 are shifted out by the $4f_{sc}$ sampling signal during the write window 52 when AND gate 412 is enabled by the memory write window signal WWS. These stored samples are applied to adder 406 coincident in time with corresponding pixel samples Y. Adder 406 develops the average thereof which is supplied via MUX 408 as samples $Y_I$. Samples I and Q are similarly averaged by processors 424 and 444 with stored samples from I and Q shift registers 422 and 442 which are shifted by clock signal $f_{sc}$ when AND gate 432 is enabled by write window signal WWS.

Modifications are contemplated to be within the scope of the present invention as set forth in the claims following. For example, digital interpolator 118 can perform interpolation by other methods, either more simple or more complex than that described. The embodiment described merely repeats the $2\times$ magnification two times in the $4\times$ magnification mode and four times in the $8\times$ magnification mode. A simple interpolator could merely repeat the Y, I, Q samples several times without computation. A complex interpolator could compute intermediate pixel values to a quadratic, cubic or higher order approximation function.

A further modification replaces the RAMs 260, 262 and 264 of interpolator 118 with shift registers of like storage capacity i.e. in a shift-in, shift-out arrangement as is employed in noise reducer 106. This modification simplifies read address generator 116 somewhat but increases the complexity of interpolator 118 so as to provide various time multiplexing of shift clock signals and to provide combining of input and output samples to perform vertical interpolation.

Figure 13:
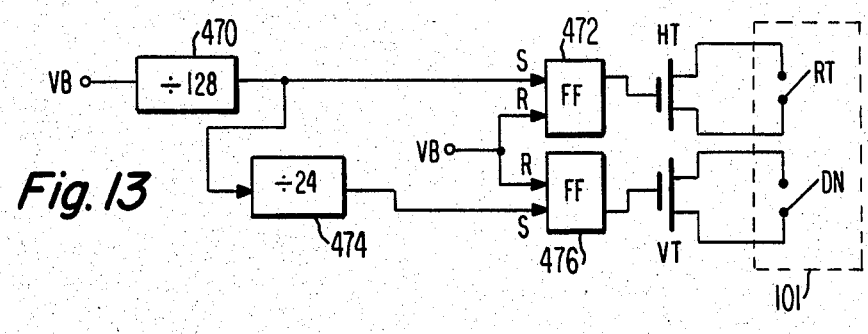

A desirable feature is provided by the modification shown in FIG. 13. Divide-by-128 counter 470 responds to vertical blanking signal VB to produce an output level to set flip flop 472 approximately every 2⅛ seconds. Flip flop 472 being set applies a signal to turn on horizontal field-effect transistor HT to short position switch RT thereby to move the magnified image area 50 to its next rightward position. Flip flop 472 is reset by the next VB signal. After every twenty four rightward increments, horizontal up-down counter 152 of window generator 104 of FIG. 4 repeats itself to return the image to the left edge of the TV picture. Divide-by-twenty-four counter 474 produces an output at that time to set flip flop 476 which turns on vertical transistor VT shorting switch DN thereby to move the magnified image area to its next downward position. Counter 474 may conveniently be the divide-by-twenty-four counter within horizontal counter 152. As a result, the magnified picture area automatically moves left-to-right and top-to-bottom in the manner English-language text is written. This feature is beneficial, for example, as an aid for making teletext or computer text display information more easily readable by visually-impaired persons.

It is noted that the digital signal processing circuitry described herein requires only commercially available standard electronic components, however, a custom integrated circuit arrangement would be lower in production cost. Digital television integrated circuits to perform the functions of apparatus 16–24 are available from ITT Semiconductors Worldwide.

In addition, RAMS 110, and 112 can be combined as a 1024×16 bit RAM in which case read address generator 116 and digital interpolator 118 are modified to process data samples twice during the interval between occurrences of read window 50 rather than thrice as described above. Similarly., buffer RAMS 262 and 264 could be combined as a 32×16 bit RAM. The sequential data transfer from RAMS 108, 110, 112 and interpolation processing described herein in Y, I, Q order can be performed in any order desired. This remains true when Y, R-Y and B-Y components are employed for the NTSC system or the U and ±V signals are employed for the PAL system.

A further modification provides for the expansion of the size of read window area 50 when, for example, 4× or 8× magnification is selected by modifying counters 140 and 160 of window generator 104 to be divide-by-sixteen counters and modifying the decoding of the outputs thereof to be responsive to magnifier signals 2×, 4×, 8×. With 2× magnification selected, resetting of flip flops 136, 156 and decoding by XOR gates 142, 152 is as shown. With 4× or 8× magnification, flip flops 136, 156 are reset by the "8" weighted outputs of counters 140, 160, and detectors of counter states 0011 and 0100 replace XOR gates 142, 162. In addition, the presetting of counters 214 and 232 of read address generator 116 is modified accordingly to preset only in the 8× condition.

Digital matrix 26 and DACs 28, 20, 32 can be replaced by DACs 28', 30' and 32' (not shown) converting the Y, I and Q digital signals, respectively, into corresponding analog signals which are then combined in a conventional analog matrix, as is the arrangement in the ITT digital television integrated circuits referred to above.

What is claimed is:

1. In a television receiver including a source of analog video signals, an analog-to-digital converter for producing digital samples representative of said analog video signals, a digital signal processor for producing digital luminance and digital chrominance samples from said digital samples, and a converting means for developing image representative signals from said digital luminance and said digital chrominance samples to produce a raster-scanned image on a raster-scanned display device, apparatus modifying said digital luminance and said digital chrominance samples for magnifying a predetermined area of said image by a factor $2^I$, said predetermined image area including M image elements and N lines of said raster scan, wherein I, M and N are integers, comprising:

window generating means for locating said predetermined image area at selectable predetermined horizontal an vertical positions of said image and for locating said magnified image area in predetermined horizontal and vertical relationship to said predetermined image area;

a user-actuated device coupled to said window generating means for selecting said selectable predetermined horizontal and vertical positions;

a first digital memory to which said digital luminance and said digital chrominance samples are applied, said first digital memory having first addressable storage registers for storing a number MxN of said digital luminance samples corresponding to said predetermined image area, and having second addressable storage reqisters for storing a number no greater than (M×N)/2 of said digital chrominance samples corresponding to said predetermined image area;

addressing means responsive to said window generating means for developing first addressing signals to address said first and second addressable storage registers to store ones of said digital luminance and said digital chrominance samples at times when lines of said raster scan correspond to said predetermined image area, and for developing second addressing signals to address said first and second addressable storage registers to produce said stored ones of said digital luminance and said digital chrominance samples at times of said lines other than times of said lines corresponding to said magnified image area;

interpolating means to which said produced stored ones of said digital luminance and said digital chrominance samples are applied for developing $2^I \times M$ image samples representing modified digital luminance and modified digital chrominance samples corresponding to one line of said raster scan of said magnified image area, said interpolating means including a second digital memory for storing said $2^I \times M$ image samples developed during an interval between times of said lines during which said magnified image is produoed, and for producing said $2^I \times M$ stored image samples at said times of said lines during which said magnified image is produced, said interpolating means repeating the sequence of developing, storing and producing $2^I \times M$ image samples for each line corresponding to the $2^I \times N$ lines of said magnified image area; and multiplexing means responsive to said window generating means for applying said modified digital luminance and said modified digital chrominance samples in place of the digital luminance and digital chrominance samples, respectively, corresponding to said magnified image area, whereby the image produced on said display device includes a magnified portion thereof in accordance with said position selected by said user-actuated device.

2. In the apparatus of claim 1 wherein said magnified image is produced having selectable magnifications of $2^I$ and $2^{I+J}$, where J is an integer, said addressing means including means for modifying said second addressing signals developed to include $1/(2^J)$ values thereof when said $2^{I+J}$ magnification is selected, whereby only $1/(2^J)$ of said $2^I \times M$ image samples stored by said digital memory are produced during times when said $2^{I+J}$ magnified image area is produced.

3. The apparatus of claim 1 wherein said second digital memory includes addressable storage registers addressed for storing and for producing said $2^I \times M$ image samples in response to a first portion of said second addressing signals developed by said addressing means.

4. The apparatus of claim 1 wherein said interpolating means includes:
averaging means for developing interpolated samples by averaging respective adjacent ones of said produced stored ones of said digital luminance and said digital chrominance samples as they are produced by said first digital memory;
timing means for developing timing signals representative of at least first and second intervals within said interval betwee times of said lines during which said magnified image is produced; and
multiplexing means responsive to said timing signals for coupling said produced stored ones of said digital luminance samples to said averaging means during said first intervals and for coupling said produced stored ones of said digital chrominance signals thereto during said second intervals.

5. The apparatus of claim 4 wherein said averaging means includes a latch means for storing a first one of said produced stored digital samples, a digital adder, a second multiplexing means for applying said first one digital sample to said adder to produce substantially said first one digital sample and for applying said stored first one digital sample and a next one digital sample to said adder to produce said interpolated sample.

6. The apparatus of claim 5 wherein said second digital memory produces selected ones of said image samples during said first and second intervals, said averaging means includes second latch means for storing samples produced by said adder, and said second multiplexing means further couples said produced selected ones of said image samples and said samples stored by said second latch means to said adder.

7. The apparatus of claim 1 wherein said window generating means includes positioning means for periodically changing the selected location of said magnified image area according to a predetermined sequence.

8. The apparatus of claim 7 wherein said positioning means develops said predetermined sequence to move said magnified image area from left to right and from top to bottom.

9. The apparatus of claim 1 wherein said window generating means includes a digital window counter having a plurality of counting states, a first digital detector to which said digital window counter is coupled for detecting first and second counting states thereof as boundaries of said magnified image area, and a second digital detector to which said digital window counter is coupled for detecting third and fourth counting states thereof intermediate said first and second counting states as boundaries of said predetermined image area, whereby the boundaries of said predetermined image area are within the boundaries of said magnified image area.

10. The apparatus of claim 1 wherein said addressing means includes a first digital counter responsive to a first clocking signal for counting to develop said first addressing signals, a second digital counter responsive to a second clocking signal for counting to develop said second addressing signals, and means for inhibiting said first digital counter from counting to develop said first addressing signals, whereby the same stored ones of said digital luminance and said digital chrominance samples are repeatedly produced in response to said second clocking signal.

11. The apparatus of claim 1 wherein said addressing means includes a first digital counter responsive to a clocking signal for counting to develop a first portion of said second addressing signals, a second digital counter responsive to an output developed by said first digital counter for counting to develop a second portion of said second addressing signals, and means responsive to said window generating means for developing said clocking signal to produce said first portion of said second addressing signals at least twice during the interval between times during which said magnified image is produced.

12. The apparatus of claim 11 wherein said means for developing said clocking signal develops said clocking signal to further produce said first portion of said second addressing signals during said time during which said magnified image is produced, and said second digital memory stores said $2^I \times M$ image samples in response to said first portions of said second addressing signals developed during the interval between times of said lines during which said magnified image is produced and produces said $2^I \times M$ stored image samples in response to said first portion of said second addressing signals developed during said time of said lines during which said magnified image is produced.

13. The apparatus of claim 12 wherein said interpolating means includes:
averaging means for developing interpolated samples by averaging respective adjacent ones of said produced stored ones of said digital luminance and said digital chrominance samples as they are produced by said first digital memory;
timing means for developing timing signals representative of first and second intervals corresponding to the times when said first portion of said second addressing signals are twice produced during the interval between times of said lines during which said magnified image is produced; and
multiplexing means responsive to said timing signals for coupling said produced stored ones of said digital luminance signals to said averaging means during said first intervals and for coupling said produced stored ones of said digital chrominance signals to said averaging means during said second intervals;
wherein said averaged digital luminance and digital chrominance samples are stored in said second digital memory during said first and second intervals, respectively, as respective interpolated luminance and chrominance components of said $2^I \times M$ image samples.

14. The apparatus of claim 1 further comprising noise reducing means for processing said digital luminance and said digital chrominance samples before they are applied to said first digital memory, said noise reducing means including means for selectively combining presently received ones of said digital luminance and of said digital chrominance samples with corresponding respective ones thereof produced by said first digital memory.

15. In a television receiver including a source of analog video signals, an analog-to-digital converter for producing digital samples representative of said analog video signals, a digital signal processor for producing digital luminance and digital chrominance samples from said digital samples, and a converting means for developing image representative signals from said digital luminance and said digital chrominance samples to produce a raster-scanned image on a raster-scanned display device, apparatus modifying said digital luminance and said digital chrominance samples for magnifying a predetermined area of said image by a factor $2^I$, said predetermined image area including M image elements and N lines of said raster scan, wherein I, M and N are integers, comprising:

window generating means for locating said predetermined image area at selectable predetermined horizontal and vertical positions of said image and for locating said magnified image area in predetermined horizontal and vertical relationship to said predetermined image area;

a user-actuated device coupled to said window generating means for selecting said selectable predetermined horizontal and vertical positions;

a digital memory to which said digital luminance and said digital chrominance samples are applied, said digital memory having first addressable storage registers for storing a number M×N of said digital luminance samples corresponding to said predetermined image area, and having second addressable storage registers for storing a number no greater than (M×N)/2 of said digital chrominance samples corresponding to said predetermined image area;

addressing means responsive to said window generating means for developing first addressing signals to addresss said first and second addressable storage registers to store ones of said digital luminance and said digital chrominance samples at times when lines of said raster scan correspond to said predetermined image area, and for developing second addressing signals to address said first and second addressable storage registers to produce said stored ones of said digital luminance and said digital chrominance samples at times of said lines other than times of said lines corresponding to said magnified image area;

interpolating means to which said produced stored ones of said digital luminance and said digital chrominance samples are applied for developing $2^I \times M$ image samples representing modified digital luminance and modified digital chrominance samples corresponding to lines of said raster scan within said magnified image area, said interpolating means developing said $2^I \times M$ image samples for each line corresponding to the $2^I \times N$ lines within said magnified image area; and multiplexing means responsive to said window generating means for applying said modified digital luminance and said modified digital chrominance samples in place of the digital luminance and digital chrominance samples, respectively, corresponding to said magnified image area, whereby the image produced on said display device includes a magnified portion thereof in accordance with said position selected by said user-actuated device.

16. In the apparatus of claim 15 wherein said magnified image is produced having selectable magnifications of $2^I$ and $2^{I+J}$, where J is an integer, said addressing means including means for modifying said second addressing signals developed to include $1/(2^J)$ values thereof when said $2^{I+J}$ magnification is selected, whereby only $1/(2^J)$ of said $2^I \times M$ image samples stored by said digital memory are produced during times when said $2^{I+J}$ magnified image area is produced.

17. The apparatus of claim 15 wherein said addressing means includes a first digital counter responsive to a first clocking signal for counting to develop said first addressing signals, a second digital counter responsive to a second clocking signal for counting to develop said second addressing signals, and means for inhibiting said first digital counter from counting to develop said first addressing signals, whereby the same stored ones of said digital luminance and said digital chrominance samples are repeatedly produced in response to said second clocking signal.

18. In a television receiver including a source of analog video signals, an analog-to-digital converter for producing digital samples representative of said analog video signals, a digital signal processor for produing digital luminance and digital chrominance samples from said digital samples, and a converting means for developing image representative signals from said digital luminance and said digital chrominance samples to produce a raster-scanned image on a raster-scanned display device, apparatus modifying said digital luminance and said digital chrominance samples for magnifying a predetermined area of said image by a factor $2^I$, said predetermined image area including M image elements and N lines of said raster scan, wherein I, M and N are integers, comprising:

window generating means for locating said predetermined image area at selectable predetermined horizontal and vertical positions of said image and for locating said magnified image area in predetermined horizontal and vertical relationship to said predetermined image area;

positioning means coupled to said window generating means for selecting said selectable predetermined horizontal and vertical positions to periodically change the selected position of said magnified image area according to a predetermined sequence;

a digital memory to which said digital luminance and said digital chrominance samples are applied, said digital memory having first addressable storage registers for storing a number M×N of said digital luminance samples corresponding to said predetermined image area, and having second addressable storage registers for storing a number no greater than (M×N)/2 of said digital chrominance samples corresponding to said predetermined image area;

addressing means responsive to said window generating means for developing first addressing signals to address said first and second addressable storage registers to store ones of said digital luminance and said digital chrominance samples at times when lines of said raster scan correspond to said predetermined image area, and for developing second addressing signals to address said first and second addressable storage registers to produce said stored ones of said digital luminance and said digital chrominance samples at times of said lines other than times of said lines corresponding to said magnified image area;

interpolating means to which said produced stored ones of said digital luminance and said digital chrominance samples are applied for developing $2^I \times M$ image samples representing modified digital luminance and modified digital chrominance samples corresponding to the $2^I \times N$ lines of said raster scan within said magnified image area; and multiplexing means responsive to said window generating means for applying said modified digital luminance and said modified digital chrominance samples in place of the digital luminance and digital chrominance samples, respectively, corresponding to said magnified image area, whereby the image produced on said display device includes a magnified portion thereof in accordance with the sequence of said position periodically selected by said positioning means.

19. The apparatus of claim 18 wherein said positioning means develops said predetermined sequence to move said magnified image area position from left to right and from top to bottom.

20. The apparatus of claim 18 wherein said window generating means includes a digital window counter having a plurality of counting states, a first digital detector to which said digital window counter is coupled for detecting first and second counting states thereof as boundaries of said magnified image area, and a second digital detector to which said digital window counter is coupled for detecting third and fourth counting states thereof intermediate said first and second counting states as boundaries of said predetermined image area, whereby the boundaries of said predetermined image area are within the boundaries of said magnified image area.

* * * * *

UNITED STATES PATENT AND TRADEMARK OFFICE
CERTIFICATE OF CORRECTION

PATENT NO. : 4,528,585

DATED : Jul. 9, 1985

INVENTOR(S) : Thomas V. Bolger

It is certified that error appears in the above-identified patent and that said Letters Patent is hereby corrected as shown below:

Column 5, line 20   "$2^4-16$" should be --$2^4=16$ states--.

Column 14, line 56  "produoed" should be --produced--.

Column 15, line 28  "betwee" should be --between--.

Column 18, line 30  "produing" should be --producing--.

Signed and Sealed this

Twelfth Day of November 1985

[SEAL]

Attest:

Attesting Officer

DONALD J. QUIGG

Commissioner of Patents and Trademarks